March 12, 1957   D. E. ABELL ET AL   2,785,360
MAGAMP REGULATOR FOR GENERATOR FED MOTOR SYSTEM
Filed Feb. 26, 1954   3 Sheets-Sheet 2

INVENTORS
Donald E. Abell and
Gerald E. Mathias.
BY Paul E. Friedemann
ATTORNEY

March 12, 1957 D. E. ABELL ET AL 2,785,360
MAGAMP REGULATOR FOR GENERATOR FED MOTOR SYSTEM
Filed Feb. 26, 1954 3 Sheets-Sheet 3

United States Patent Office 2,785,360
Patented Mar. 12, 1957

2,785,360

MAGAMP REGULATOR FOR GENERATOR FED MOTOR SYSTEM

Donald E. Abell, Buffalo, and Gerald E. Mathias, Williamsville, N. Y., assignors to Westinghouse Electric Corporation, East Pittsburgh, Pa., a corporation of Pennsylvania Application February 26, 1954, Serial No. 412,733

8 Claims. (Cl. 318—143)

This invention relates to electrical drive systems and more particularly to adjustable voltage electrical drives.

In the past it has been the practice to provide most adjustable voltage drive systems with a voltage regulator or a counterelectromotive force regulator as the primary regulator. For applications as, for example, large shovels and also dragline earth moving and excavating machines, where high inertia or rapid response is mandatory, it is necessary to accelerate the drive at currents approaching the upper safe level for the equipment. Consequently, it is desirable to provide a means to limit the current so that it does not exceed the safe level. This is done by utilizing a secondary regulator or a secondary signal to limit the current. Of necessity, in a system of this type, the gain in the current limit regulator must be several times as large as the gain of the voltage regulator with which it is working in order to be effective. If a suitable gain is built into the voltage regulator for many applications, the current limit gain required then becomes so large as to greatly impair system stability and make it necessary to supply extra stabilizing means or compensating circuits.

Accordingly, it is one object of this invention to provide a variable voltage drive utilizing a current regulator as the primary regulator.

Another object of this invention is to provide a variable voltage drive which utilizes a current regulator as the primary regulator and a voltage, or counterelectromotive force, regulator as a secondary regulator.

Yet another object of this invention is to provide a drive of the character referred to which provides current limit for both motoring loads and overhauling loads.

A further object of this invention is to provide a drive of the character referred to which has a stepless control.

Still a further object of this invention is to provide a reversible variable voltage drive system which utilizes a current regulator as the primary regulator for each direction of operation.

Yet a further object of this invention is to provide a reversible variable voltage drive system which utilizes a current regulator as the primary regulator and a voltage, or counterelectromotive force, regulator as the secondary regulator for each direction of operation.

A more specific object of this invention is to provide a reversible variable voltage drive system of the character referred to which provides current limit for both motoring loads and overhauling loads for each direction of operation.

Another broad object of this invention is the provision of current limit control for a Ward-Leonard drive so correlated with a magnetic amplifier voltage limit control for the drive to obtain the very maximum power output without exceeding the established peak power demands of the motor.

A still further object of this invention is the provision of a system of control for a direct current generator utilizing a combination of current limit and voltage limit control to maintain the volt-ampere characteristic substantially flat to near the stall point.

The objects stated are merely illustrative. These stated objects and other objects will become more apparent from a study of the accompanying drawings and the following specification.

Figure 1:
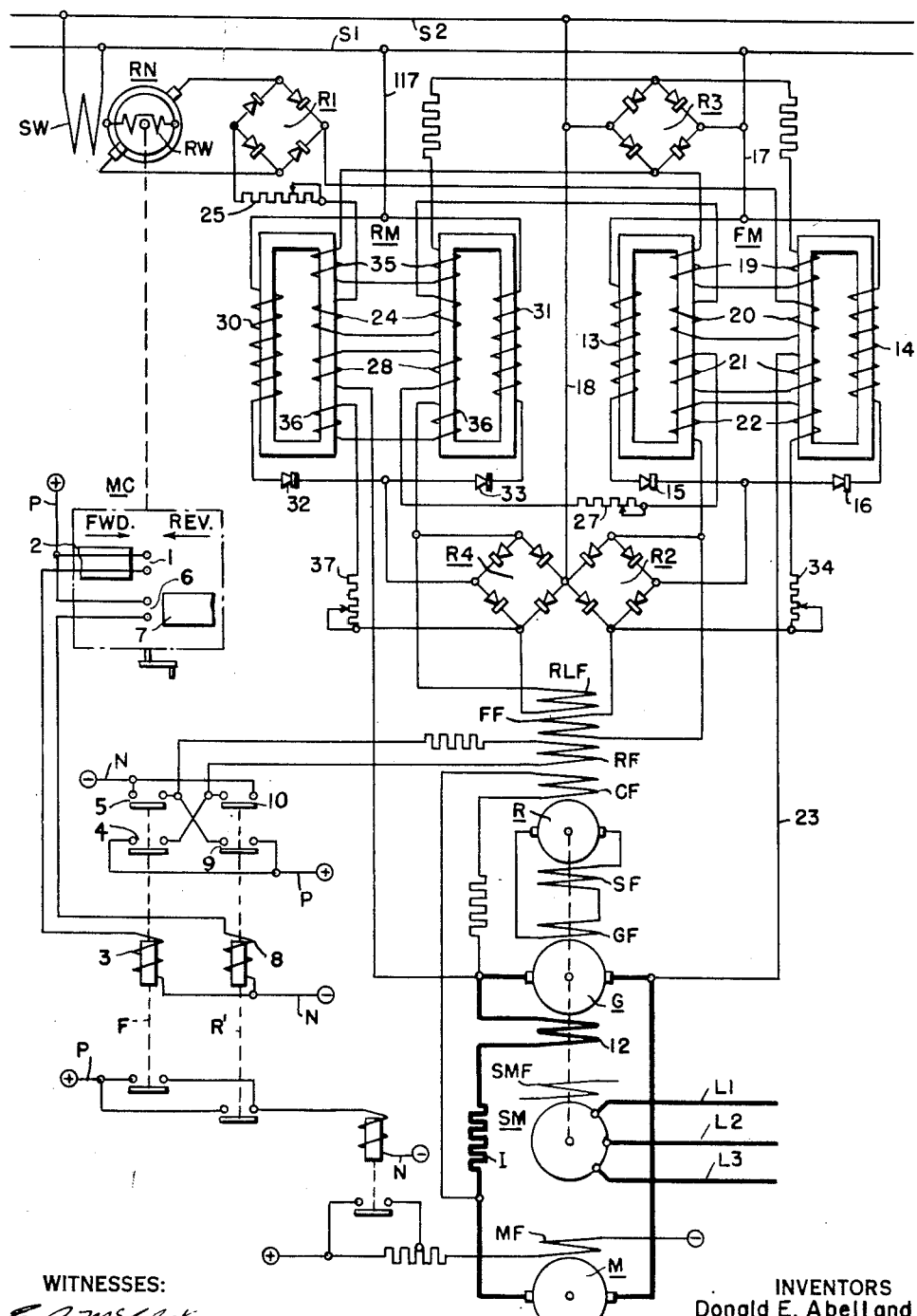
Figure 1 shows diagrammatically a circuit utilizing the invention.
Figure 2:
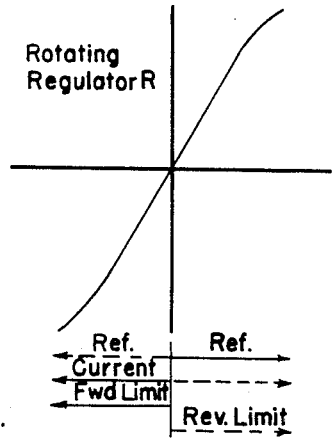
Fig. 2 shows the regulating charactertistic of the rotating regulator generator included in this control.

The circuit of Fig. 1 was designed specifically for use as a stepless shovel control although it will be apparent that the circuit as shown or with slight modifications may be applied in a large number of different applications. A main motor M is shown, whch is coupled to a suitable load, and is shown connected in a loop circuit with the main generator G. The main generator G and an amplifying generator or rotating amplifier R are coupled to be driven by a synchronous motor SM having its armature winding connected to three-phase alternating current supply leads L1, L2 and L3 and having its field winding SMF connected through a suitable control apparatus (not shown) to a source of direct current. The motor field winding MF is also connected, through a suitable control (not shown), to the source of direct current.

The generator field winding GF is connected in a loop circuit which includes the armature winding of the rotating amplifier R, and the self-energizing field winding SF. The rotating amplifier R has the resistance line of its load circuit so adjusted that it falls on the straight portion of the no-load saturating curve, hence the name rotating amplifier is applicable. To control the excitation of the regulating generator R, it is provided with a reference field winding RF, a current limit field winding CF, a forward limit field winding FF and a return limit field winding RLF. The reference field winding RF is supplied through contacts on the contactors controlled by the master controller MC from a suitable source of direct current represented by terminals P and N. The sense of the excitation applied to the reference field winding RF is determined by the direction of rotation of the master controller MC. The master controller MC is preferably of the type described in detail in the copending application of Gerald E. Mathias and Walter Schaelchlin (case 28,063). When the master switch MC is moved in the forward direction a circuit is established from the positive terminal P of a suitable source of direct current through contacts 1, bridged by the segment 2 of the master controller MC, actuating coil 3 of the forward contactor F to the negative terminal N. When the contactor F operates a circuit is established from the positive terminal P through contacts 4, field winding RF, contacts 5 to the negative terminal N.

When the master controller MC is moved in the reverse direction a circuit is established from the positive terminal P through contacts 6 bridged by the controller segment 7, the actuating coil 8 of contactor R' to the negative terminal N. When the contactor R' operates a circuit is established from the positive terminal P through contacts 9 of contactor R', the field winding RF, now excited in an opposite sense, contacts 10 to the negative terminal N.

From the foregoing it will be apparent that the reference field winding RF may be reversed in sense by reversing the position of the master controller MC and that the reference field winding RF is disconnected altogether when the master controller MC is in the neutral position.

The input terminals of the full-wave bridge rectifier R1 are connected to slip rings of the rotor of inductor RN which is coupled to the shaft of the master controller MC. The rotor inductor has a stator winding SW and a rotor winding RW. The stator winding SW is connected across two leads S1 and S2 of an alternating current supply, and the rotor winding RW is inductively coupled with the stator winding SW. The voltage of the rotor winding RW and consequently the voltage across the input terminals of the full-wave rectifier R1 is determined by the position of the rotor winding RW with respect to the stator winding SW. The position of the master controller MC determines the relative positions of the two windings RW and SW. Thus the magnitude of the voltage which excites control windings 20 and 24 on the magnetic amplifiers FM and RM respectively, is determined by the magnitude of angular movement of the master controller MC and the sense of the voltage which excites the reference field winding RF of generator R is determined by the direction of rotation of the master controller MC.

The current field winding CF, responsive to motor load current, is connected directly across an impedance I and the commutating field winding 12, which impedance and commutating field are connected in the loop circuit which includes the armature circuits of the main generator G and the motor M. Thus the current field winding CF receives an excitation which is a direct function of the current in the armature circuit of motor M. The current field CF is so connected and wound with respect to the reference field winding RF that for normal load current in the motor generator loop circuit, that is, for normal operation, either in the forward or reverse direction, the excitation of the current field CF is in opposition and equal to the excitation supplied to the rotating amplifier R by the reference field winding RF. As a consequence the rotating amplifier R acts as a current regulator and therefore the primary regulator for the system shown is a current regulator. The system just described provides adequate system forcing and current limit without impairing the system stability.

Since such a system is an adjustable voltage drive system, it is also necessary to provide a means for adjusting and regulating the voltage of the main generator G. To accomplish this, a forward magnetic amplifier FM and a reverse magnetic amplifier RM are provided. The forward magnetic amplifier FM has its circuits connected in a conventional doubler arrangement. It has main windings 13 and 14 in series with saturating rectifiers 15 and 16, respectively, and the two series circuits are connected in parallel. A point intermediate the main windings 13 and 14 is connected by means of the lead 17 to one line as S1 of the supply. A point intermediate the saturating rectifiers 15 and 16 is connected to one input terminal of the full-wave bridge rectifier R2 which has the opposite input terminal connected by lead 18 to lead S2 of the supply.

Thus, the forward magnetic amplifier is supplied from two lines of the supply. The output terminals of the full-wave bridge rectifier R2 are connected to supply the excitation for the forward field winding FF. The forward magnetic amplifier FM also has biasing windings 19, pattern winding 20, voltage windings 21 and feedback windings 22. The biasing windings 19 are connected across the output terminals of the full-wave bridge rectifier R3 which has its input terminals connected across two leads as leads S1 and S2 of the supply. The biasing windings determine the point of operation of forward magnetic amplifier FM. The pattern winding 20 of the forward magnetic amplifier is energized from the full-wave bridge rectifier R1 in a circuit that includes the positive terminal of the full-wave bridge rectifier R1, the pattern winding 20 of the forward magnetic amplifier FM, the pattern winding 24 of the reverse magnetic amplifier RM, the adjusting potentiometer 25 and the negative terminal of the full-wave bridge rectifier R1. Thus, it is seen that the two pattern field windings 20 and 24 receive the same excitation, the magnitude of which is determined by the position of the rotor winding RW of the inductor RN with respect to the stator winding SW and the adjustment of potentiometer 25. The voltage winding 21 of the forward magnetic amplifier FM is energized by the voltage of the main generator G and is connected in a circuit which includes the right-hand terminal of the main generator G, lead 23, the voltage winding 21 of the forward magnetic amplifier FM, the adjusting resistor 27, the voltage winding 28 of the reverse magnetic amplifier RM, to the left-hand terminal of the main generator G. Thus, the voltage windings 21 and 28 of the forward magnetic amplifier FM and the reverse magnetic amplifier RM, respectively, receive the same energization. The feedback winding 22 of the forward magnetic amplifier FM is connected in series with the adjusting resistor 34 across the output terminals of the full-wave bridge rectifier R2 and is provided for the purposes of stabilizing the system.

The reverse magnetic amplifier RM also has its circuit connected in conventional doubler arrangement. It has main windings 30 and 31 connected in series with the saturating rectifiers 32 and 33, respectively. A point intermediate the two main windings 30 and 31 is connected by lead 117 to one line as line S1 of the supply and a point intermediate the saturating rectifiers 32 and 33 is connected to one input terminal of the full-wave bridge rectifier R4 which has its other input terminal connected by lead 18 to another lead as lead S2 of the supply. The saturating rectifiers 32 and 33 are poled in such a manner that the main windings 30 and 31 conduct on alternate half cycles. The reverse magnetic amplifier RM also has a biasing winding 35 and a feedback winding 36. The circuits of the pattern winding 24 and the voltage winding 28 have already been traced. The biasing winding 35 is connected across the output terminals of the full-wave bridge rectifier R3, and the feedback windings 36 are connected in series with an adjusting resistor 37 across the output terminals of the full-wave bridge rectifier R4. The feedback windings 36 are supplied for stabilizing the system. The output terminals of the full-wave bridge rectifier R4 which receive the output of the reverse magnetic amplifier RM are also connected to energize the reverse limit field winding RLF.

For forward operation of the motor M the master controller MC is moved in the forward direction as indicated. The reference field winding RF is energized through the circuits previously described in a direction determined by the direction of movement of the master controller MC. Thus, the rotating amplifier R supplies an excitation to the generator field GF and the main generator G supplies the motor M with a running voltage. The current field CF attempts to force the regulating generator R to cause the main generator G to provide a voltage which will give a current in the armature of the motor M which is equal to the current limit value. The current field CF also acts to regulate the current in the armature of the motor M so that it does not exceed the current limit value. The pattern windings 20 and 24 of the forward magnetic amplifier FM and reverse magnetic amplifier RM, respectively, are also energized by the output of the full-wave bridge rectifier R1. The voltage windings 21 and 28 are connected to be energized by a voltage determined by the voltage of the main generator as previously described.

Figure 4:
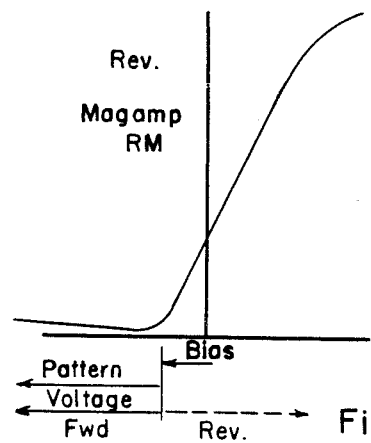
Figs. 3 and 4 show the respective regulating characteristics of the forward magnetic amplifier and reverse magnetic amplifier included in this control.
Figure 3:
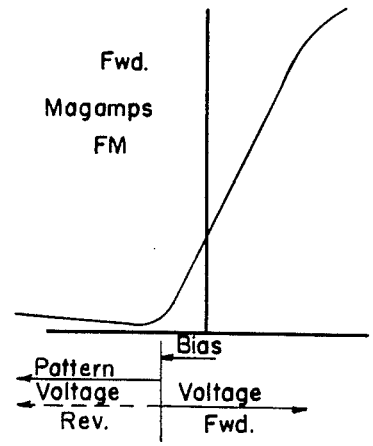

In consequence for forward operation the voltage from the main generator causes the voltage windings 21 of the forward magnetic amplifier to drive the cores of the forward magnetic amplifier FM towards saturation, and the voltage windings 28 of the reverse magnetic amplifier RM to drive the reverse magnetic amplifier RM toward cutoff. Note Figs. 3 and 4. The sense of the excitation of the pattern windings 20 and 24 of the forward magnetic amplifier FM and of the reverse magnetic amplifier RM is always in the same direction and tends to drive the cores of both the magnetic amplifiers towards cutoff.

For forward operation the voltage winding 21 and the pattern winding 20 of the forward magnetic amplifier are in opposition and they are adjusted such that when the main generator G has the forward voltage selected for it by the position of the master controller MC, the forward magnetic amplifier FM will have no output but if the voltage of the main generator G exceeds the voltage selected for it, the forward magnetic amplifier will have an output voltage which will appear across the forward limit field windings FF of the rotating amplifier R, and the sense of that excitation will be such as to reduce the output of the rotating amplifier R and consequently the excitation of the generator field winding GF of the main generator G to limit the voltage of the main generator G for forward operation. That is, as long as the voltage of the main generator G is either below that or equal to that voltage selected for it by the position of the master controller MC, the forward magnetic amplifier FM will have substantially no output, and if the voltage of the main generator exceeds that voltage selected for it, the current circulating through the voltage winding 21 will cause the magnetomotive force of the voltage winding 21 to overcome the magnetomotive force of the pattern winding 20 and the bias winding 19 and thus cause the forward magnetic amplifier FM to become conductive. The output of the forward magnetic amplifier FM will then appear across the output terminals of the full-wave bridge rectifier R2 which supplies the forward limit field winding FF. The forward limit field winding will then act to reduce the overall excitation of the rotating amplifier generator R to thus reduce the excitation of the main generator field winding GF and thereby limit the voltage of the main generator G. During all this time the winding 28 on the reverse magnetic amplifier keeps this magnetic amplifier at cut-off so that it provides no control effect, being in effect deactivated.

For reverse operation the voltage winding 28 and the pattern winding 24 of the reverse magnetic amplifier RM are in opposition and they are adjusted such that when the main generator G has the reverse voltage selected for it by the position of the master controller MC, the reverse magnetic amplifier RM will have no output but if the reverse of the main generator G exceeds the voltage selected for it, the reverse magnetic amplifier will have an output voltage which will appear across the reverse limit field windings RLF of the rotating amplifier R, and the sense of that excitation will be such as to reduce the output of the rotating amplifier R and in consequence the excitation of the generator field winding GF of the main generator G will limit the voltage output of the main generator for reverse operation. That is, as long as the voltage of the main generator G is either below that or equal to that reverse voltage selected for it by the position of the master controller MC, the reverse magnetic amplifier RM will have substantially no output, and if the voltage of the main generator G exceeds that voltage selected for it, the current circulating through the voltage winding 28 will cause the magnetomotive force of the voltage winding 28 to overcome the magnetomotive force of the pattern winding 24 and the bias winding 35 and thus cause the reverse magnetic amplifier RM to become conductive. The output of the reverse magnetic amplifier RM will then appear across the output terminals of the full-wave bridge rectifier R4 which supplies the reverse limit field winding RLF. The reverse limit field winding will then act to reduce the overall excitation of the rotating amplifier R to reduce the excitation of the main generator field winding GF and thereby limit the voltage of the main generator G.

Figure 5:
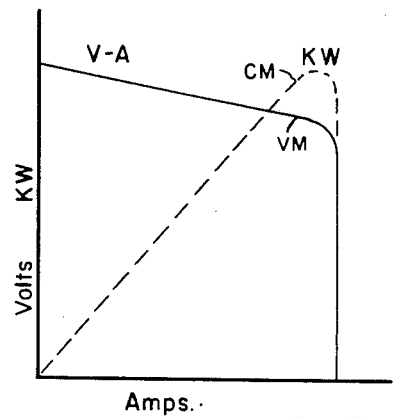
Fig. 5 shows power output curve and the volt-ampere curves that may be obtained with the system of control shown in Fig. 1.

This control thus lends itself very effectively to shovel control where the operation for best results is to maintain a very maximum torque and yet not stall the motor. The relation of the current regulation and voltage regulation may thus be so selected that a current corresponding to point CM on Fig. 5 is selected as the current maximum for which the regulation is set, and the voltage regulating feature of this control is set to regulate for a voltage maximum indicated by point VM on Fig. 5. From the power curve, or KW curve, it is thus apparent that the very maximum power output is obtained without stalling the drive.

Figure 7:
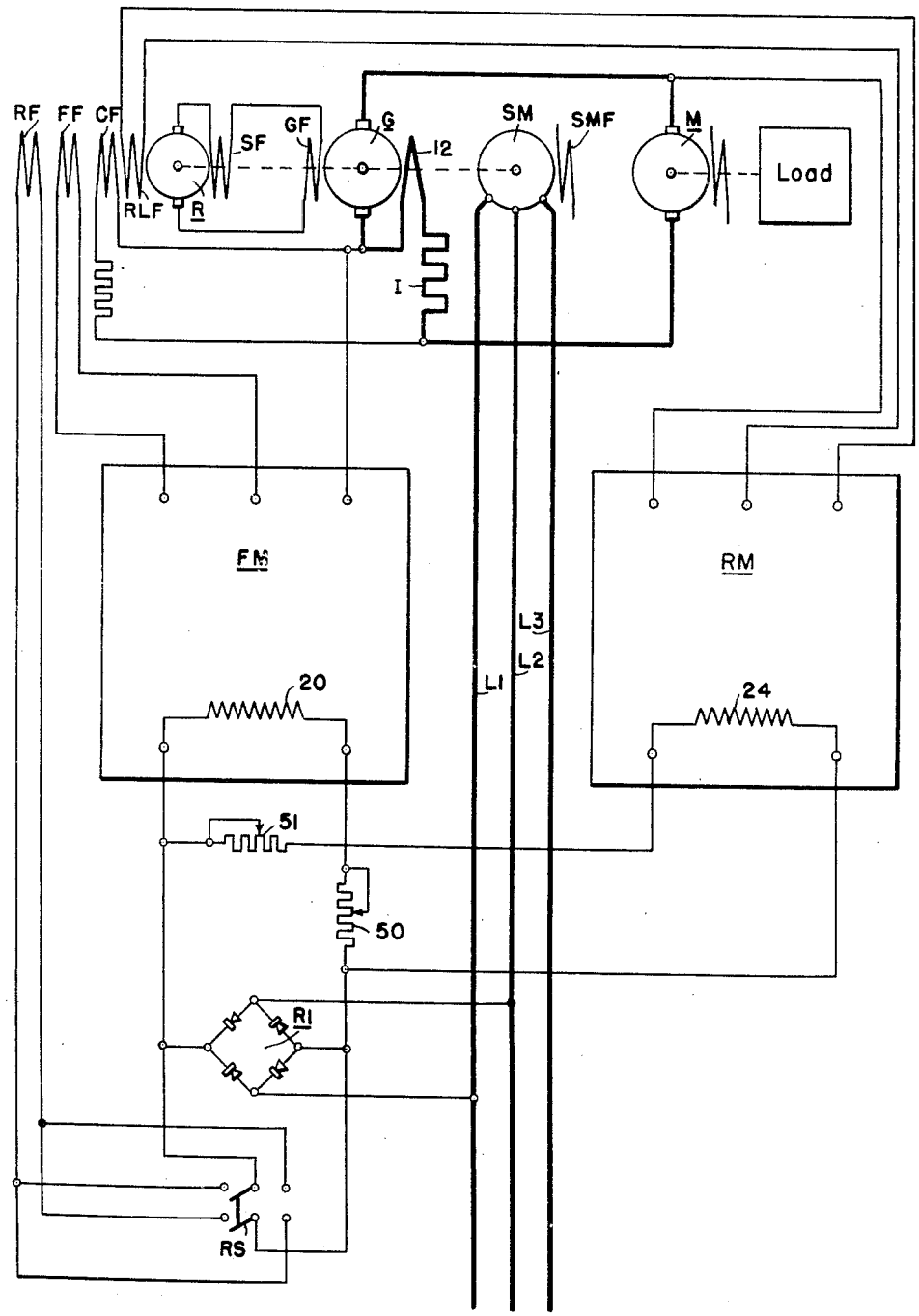
Fig. 7 shows another embodiment of the invention.

Fig. 7 shows another embodiment of the system shown in Fig. 1 and therefore the components of Fig. 7 which correspond to components of Fig. 1 are given the same reference numerals and only the parts of the circuit which have been changed are shown in detail and are provided with new reference numerals. In Fig. 7 the reversing switch RS is substituted for the master controller MC of Fig. 1, and the full-wave bridge rectifier R1 is connected directly across two lines of the three-phase supply instead of through the rotatable inductor RN. The reversing switch RS is provided only for reversing the excitation of the reference field winding RF. The modification shown in Fig. 7 is of particular value for planer control. For this type of control the pattern field winding 20 of the cut-limit or forward magnetic amplifier FM is connected in series with an adjusting potentiometer 50 directly across the output terminals of the full-wave bridge rectifier R1 instead of being connected in series with the pattern field winding 24 of the return limit magnetic amplifier RM. The pattern field winding 24 of the return limit magnetic amplifier RM is connected in series with the adjusting potentiometer 51 directly across the output terminals of the full-wave bridge rectifier R1. The components of Fig. 7 which correspond to the components of Fig. 1 operate in the same manner as described for Fig. 1 except that the pattern fields 20 and 24 of the cut-limit or forward magnetic amplifier FM and the return limit magnetic amplifier RM, respectively, may be and usually are adjusted to have different excitation levels in the system shown in Fig. 7. Since the system of Fig. 7 is designed specifically for a planer control, hence the name cut-limit magnetic amplifier, that is, the forward direction is the cut direction for the planer. The cut-limit forward magnetic amplifier FM is still adjusted to operate with no output when the voltage of the main generator G is equal to or less than the voltage selected for it for forward operation and the return limit magnetic amplifier RM would also operate with substantially no output if the voltage of the main generator G were equal to or less than the voltage selected for the main generator for the return stroke of the planer. However, the pattern fields 20 and 24 are provided with independent adjusting circuits so that the planer can cut at one speed usually a relatively low speed and return at still another speed usually a relatively higher speed, but in the circuit shown the reference field winding RF will be supplied with the same voltage for either direction of operation and therefore it will be necessary for the forward limit field winding to be energized when the planer is cutting since the cutting stroke will generally be slower, as already mentioned, than the return stroke. In other words the excitation of pattern field 20 for the cut-limit magnetic amplifier FM will be adjusted such that when the main generator G is operating at the voltage at which it would normally operate when the reference field winding RF is supplied by the output of the full-wave bridge rectifier R1, the voltage winding of the cut limit or forward magnetic amplifier FM will cause the forward magnetic amplifier to conduct and supply an excitation to the forward limit field winding FF to reduce the output of the rotating amplifier R and thereby reduce the excitation of the main generator field GF to reduce the output voltage of the main generator G. Thus the forward limit field winding FF will continuously be utilized to force the voltage of the main generator G down during the cut stroke of the planer.

It has been explained how the circuits shown provide a system which utilizes a current regulator with adjustable voltage limit, and how the motor armature current is accurately limited to the value for which the current regulator is adjusted. The versatility of the systems will be better appreciated and more thoroughly understood from a discussion of the inherent limiting by this regulating system of overhauling or regenerative currents. The overhauling or regenerative current limit is accomplished through the use of one of the many core materials which display a sharp saturation point as the core material for the forward and reverse magnetic amplifiers FM and RM. For the following discussion reference is had specifically to the circuit of Fig. 1.

It has been pointed out that when the drive is accelerating or running at the regulative current, the output of the particular voltage regulating magnetic amplifier which is in use, is at its minimum value providing the voltage of the main generator G is at or below the selected limit value. If, however, the current in the armature of the motor M is below the regulated value it will cause the rotating amplifier R to force the generator G to increase its output voltage to force the current in the motor armature circuit up to the selected regulated value. At the same time, if the voltage of the main generator is forced to equal or exceed the voltage limit value, then the forward magnetic amplifier FM (assuming forward operation) begins to conduct and tries to limit the voltage of the main generator as previously described, if the characteristics of the forward magnetic amplifier FM are adjusted such that when the current in the armature circuit of the motor M is one-half of the magnitude for which the current regulator is adjusted, ¼ of the available output of the magnetic amplifier FM, as operating point B, Fig. 6, is required to limit the voltage of the main generator G.

Figure 6:
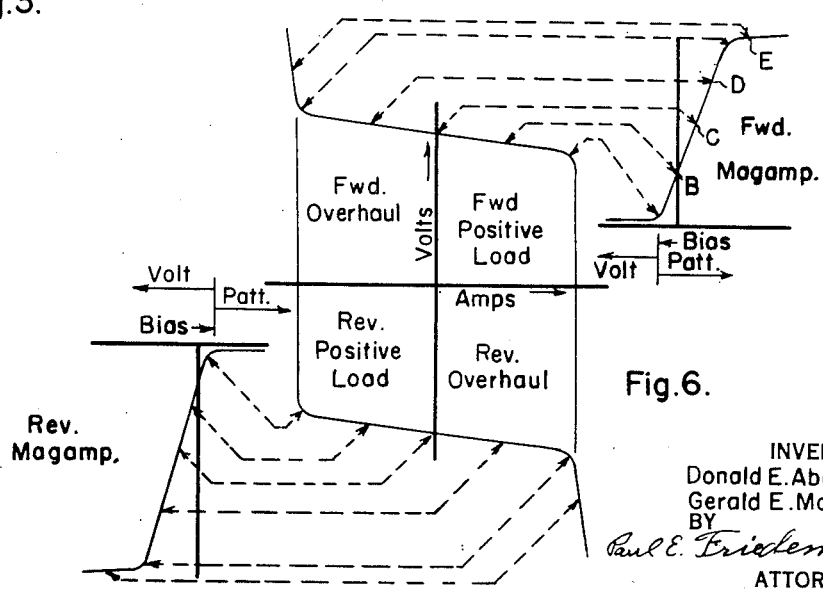
Fig. 6 shows some curves illustrating the advantages of this control when overhauling loads are encountered.

Under the conditions just recited, when the drive is running at no load, that is, zero current in the armature circuit of the motor M, the current regulator would force the voltage of the main generator G up to such a value that the voltage winding 21 of the forward magnetic amplifier FM would force the forward magnetic amplifier FM to have an output voltage of ½ of its total available output voltage as point C, Fig. 6. Similarly, it should be understood that with an overhauling load producing a regenerative current, the excitation of the current limit field CF will be aiding with respect to the excitation of the reference field winding RF and therefore would require an even greater output from the forward magnetic amplifier FM to limit the voltage of the generator G. For example, if under the circumstances considered here an overhauling load produces a regenerative current of a magnitude which is equal to ½ of the magnitude of the current for which the current regulator is adjusted to regulate, the output voltage of the main generator G would be forced up to the extent that the forward magnetic amplifier FM must supply a voltage to the forward limit field windings FF which is equal to ¾ of the maximum available output (point D) of the magnetic amplifier to limit the voltage of the main generator G, and accordingly when an overhauling or regenerative current, which is equal in magnitude to the current for which the regulator is adjusted to regulate, flows in the armature circuit of the motor M, the forward magnetic amplifier FM must supply its maximum output voltage in order to maintain the voltage limit value for the main generator G. At this point, as point E in Fig. 6, any further increase in regenerative or overhauling current does not cause the forward magnetic amplifier FM to increase its output since the cores of the forward magnetic amplifier FM have reached the saturation level. As a consequence, the voltage of the main generator G increases. This increase in the output voltage of the main generator G relieves the voltage unbalance that is causing the regenerative current to flow and in this manner prevents excessive current peaks on regeneration, or in other words, the system performs a current limit function by allowing the system voltage to rise.

It is to be particularly understood that the regenerative current limit can be made independent of the regulated load current since the operating point on the magnetic amplifier characteristic is determined by the amount of signal excitation provided and the resistance in the load circuit. For example, it is possible to accelerate at 150% rated motor current and decelerate at 100% rated current or vice versa. For regenerative current limit on reverse operation of the motor M, the reverse magnetic amplifier RM operates in the same manner as described for the forward magnetic amplifier FM and therefore no further explanation is thought to be necessary. It should be apparent that the objects of this invention have been accomplished by providing an electrical drive system with a current regulator and adjustable voltage limit which is capable of providing current limit for both motoring and regenerative currents and which is applicable where high inertia or rapid response is necessary.

Although specific embodiments of the invention have been shown and discussed in detail, it should be understood that the invention is not limited thereto or thereby, but that equivalents are clearly within the inventive scope.

We claim as our invention:

1. A system of control for an electrical drive comprising, a motor, a main generator having its armature winding connected in loop circuit with said motor, excitation means for said main generator, magnetic amplifier means, means to determine the magnitude and sense of energization of the excitation means for said main generator in accordance with the magnitude and sense of a reference source, the current in the motor armature circuit, and the output of said magnetic amplifier means, and means to determine the magnitude of the output of said magnetic amplifier means in accordance with the voltage of the main generator above a preselected value and the sense of the output of said magnetic amplifier means in accordance with the sense of the main generator voltage.

2. A system of control for an electrical drive comprising, a motor, a main generator having its armature winding connected in loop circuit with said motor, excitation means for said main generator, first and second individual amplifying channels, said first and second individual amplifying channels each comprising an individual magnetic amplifier, each of said individual magnetic amplifiers having individual main windings, individual pattern control windings, and individual voltage control windings, said individual main windings being connected to receive a supply voltage, said individual pattern control windings being connected to receive a pattern signal voltage, and said individual voltage control windings being connected to receive a voltage which is a function of the main generator voltage so that the individual amplifying channels are rendered selectively conductive in accordance with the sense of the voltage of the main generator when said main generator voltage is above a preselected value, and means for determining the energization of the excitation means for said main generator in accordance with the magnitude and sense of the output of the individual amplifying channels, a reference signal, and the current in the motor armature loop circuit.

3. In a control system for an electric drive, the combination of a motor, a main generator having its armature winding connected in loop circuit with said motor excitation means for said main generator, an amplifying generator connected to determine the magnitude and sense of the energization of the excitation means for the main generator, excitation means for said amplifying generator, first and second individual amplifying channels, said first and second individual amplifying channels each comprising an individual magnetic amplifier, each of said individual magnetic amplifiers having individual main windings, individual pattern control windings, and individual voltage control windings, said individual main windings being connected to receive a supply voltage, said individual pattern control windings being connected to receive a pattern signal voltage, and said individual voltage control windings being connected to receive a voltage which is a function of the main generator voltage so that the individual amplifying channels are rendered selectively conductive in accordance with the sense of the voltage of the main generator when said main generator voltage is above a preselected value, and means for determining the energization of the excitation means for said amplifying generator in accordance with the magnitude and sense of the output of the individual amplifying channels, a reference signal, and the current in the motor armature loop circuit.

4. In a control system for an electric drive, the combination of a motor, a main generator having its armature winding connected in loop circuit with said motor, excitation means for said main generator, an amplifying generator connected to determine the magnitude and sense of the energization of the excitation means for the main generator, first, second, third and fourth excitation means for said amplifying generator; and first and second individual magnetic amplifier channels, said first magnetic amplifier channel being connected to determine the excitation of said first excitation means, said second magnetic amplifier being connected to determine the excitation of said second excitation means, said first and second magnetic amplifier channels being connected to be selectively rendered conductive in accordance with the sense of the main generator voltage when the magnitude of said main generator voltage is above a preselected value, said third excitation means being connected to be energized in accordance with a reference voltage, and said fourth excitation means being connected to be energized in accordance with the current in the armature circuit of the motor.

5. In a control system for an electric drive, the combination of a motor, a main generator having its armature winding connected in loop circuit with said motor, excitation means for said main generator, an amplifying generator connected to determine the magnitude and sence of the energization of the excitation means for the main generator; first, second, third and fourth excitation means for said amplifying generator; and first and second individual amplifying channels, said first and second individual amplifying channels each comprising an individual magnetic amplifier, each of said individual magnetic amplifiers having individual main windings, individual pattern control windings, and individual voltage control windings, said individual main windings being connected to receive a supply voltage, said individual pattern control windings being connected to receive a pattern signal voltage, and said individual voltage control windings being connected to receive a voltage which is a function of the main generator voltage so that the individual amplifying channels are rendered selectively conductive in accordance with the sense of the voltage of the main generator when said main generator voltage is above a preselected value; said first and second excitation means being connected to receive the output of said first and second amplifying channels respectively, said third excitation means being connected to receive a reference signal, and said fourth excitation means being connected to receive a signal which is a function of the current in the armature circuit of the motor.

6. In a control system for an electric drive, the combination of a motor, a main generator having its armature winding connected in loop circuit with said motor, excitation means for said main generator, an amplifying generator connected to determine the magnitude and sense of the energization of the excitation means for the main generator; first, second, third and fourth excitation means for said amplifying generator; and first and second individual magnetic amplifier channels, said first magnetic amplifier channel being connected to determine the excitation of said first excitation means, said second magnetic amplifier being connected to determine the excitation of said second excitation means, said first and second magnetic amplifier channels being connected to be selectively rendered conductive in accordance with the sense of the main generator voltage, said third excitation means being connected to be energized in accordance with a reference voltage, and said fourth excitation means being connected to be energized in accordance with the current in the armature circuit of the motor.

7. A system of control for an electrical drive comprising, a motor, a main generator having its armature winding connected in loop circuit with said motor, excitation means for said main generator, first and second individual amplifying channels, said first and second individual amplifying channels each comprising an individual magnetic amplifier, each of said individual magnetic amplifiers having individual main windings, individual pattern control windings, and individual voltage control windings, said individual main windings being connected to receive a supply voltage, said individual pattern control windings being connected in series with each other across a pattern signal power source, and said individual voltage control windings being connected to receive a voltage which is a function of the main generator voltage so that the individual amplifying channels are rendered selectively conductive in accordance with the sense of the voltage of the main generator when said main generator voltage is above a preselected value, and means for determining the energization of the excitation means for said main generator in accordance with the magnitude and sense of the output of the individual amplifying channels, a reference signal, and the current in the motor armature loop circuit.

8. A system of control for an electrical drive comprising, a motor, a main generator having its armature winding connected in loop circuit with said motor, excitation means for said main generator, first and second individual amplifying channels, said first and second individual amplifying channels each comprising an individual magnetic amplifier, each of said individual magnetic amplifiers having individual main windings, individual pattern control windings, and individual voltage control windings, said individual main windings being connected to receive a supply voltage, said individual pattern control windings being connected to receive individual pattern signal voltages, and said individual voltage control windings being connected to receive a voltage which is a function of the main generator voltage so that the individual amplifying channels are rendered selectively conductive in accordance with the sense of the voltage of the main generator when said main generator voltage is above a preselected value, and means for determining the energization of the excitation means for said main generator in accordance with the magnitude and sense of the output of the individual amplifying channels, a reference signal, and the current in the motor armature loop circuits.

References Cited in the file of this patent
UNITED STATES PATENTS
2,594,015  Halter _____ Apr. 22, 1952